Aug. 3, 1926.  
E. P. COLE  
AIR TREATING DEVICE  
Filed August 11, 1924  
1,594,354
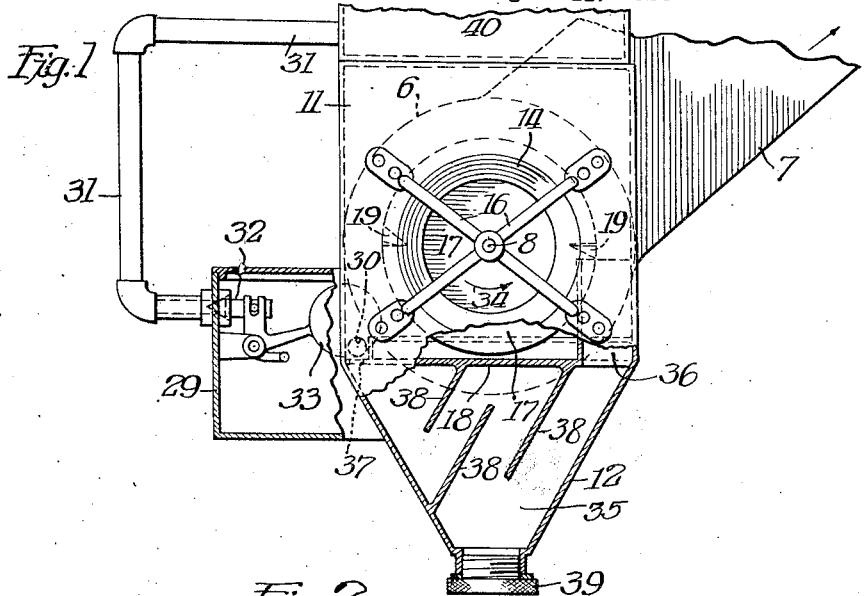
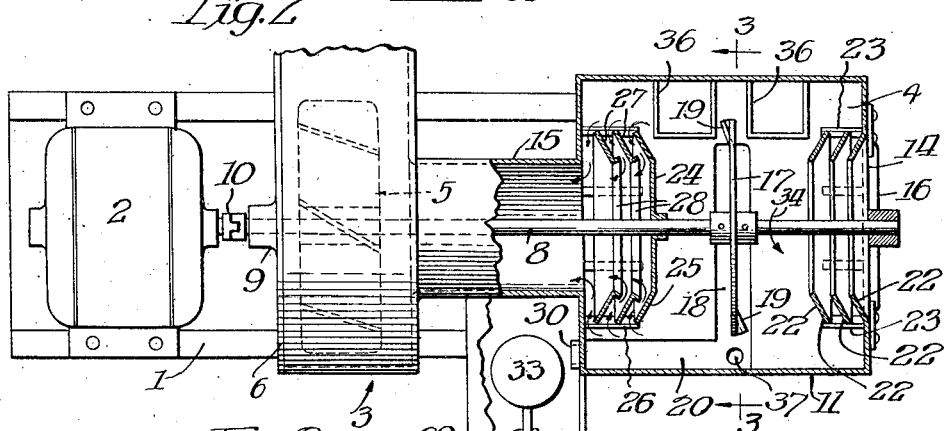
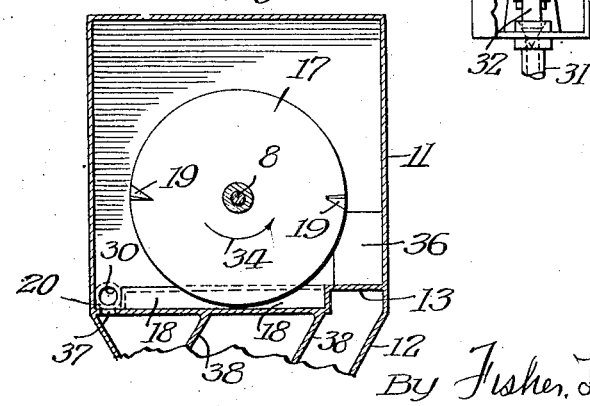
Inventor:  
Edward P. Cole,  
By Fisher, Fowle, Clapp & Evans.  
Attys.

Patented Aug. 3, 1926.

1,594,354

UNITED STATES PATENT OFFICE.

EDWARD P. COLE, OF CHICAGO, ILLINOIS.

AIR-TREATING DEVICE.

Application filed August 11, 1924. Serial No. 731,274.

My invention has reference more particularly to a device for purifying and humidifying air by subjecting it to a finely divided mist or spray of water.

The principal objects of my invention are to thoroughly wash and purify air; to leave just enough moisture in the air so that it is in the proper condition for breathing; to furnish a large volume of pure air at a low operating expense; to minimize the amount of water which is required to wash and purify the air; to arrange the machine so that the water is filtered or purified after being used and rendered suitable for use over and over again; to construct the machine in a compact convenient form; to automatically control the supply of water so that the air is washed uniformly; and in general, to provide a simple, inexpensive and easily constructed air conditioning device which is adapted to operate continuously without attention or trouble.

On the drawings:

Fig. 1 is a view looking at the inlet end of the device, with portions broken away to disclose details of the construction;

Fig. 2 a top view, with the water supply tank removed and showing the air washer unit and float chamber in section; and Fig. 3 a sectional view on the line 3—3 of Fig. 2.

Referring to the drawings, the reference numeral 1 indicates a base on which are mounted in alignment a motor 2, blower 3 and washer unit 4. The blower may be of any desired type, for example as shown in the drawings, wherein 5 indicates a fan with radial blades or vanes enclosed in a casing 6, which has a large inlet opening at one side and a discharge duct 7 leading from the periphery of the casing. The shaft 8 to which the fan is fixed, is journaled in a bearing 9 in the side wall of the casing 6 opposite the inlet opening and is coupled as at 10 to the armature shaft of the motor 2.

The washer unit 4 comprises a casing 11, in the present instance rectangular in form and having a hopper shaped bottom 12 separated from the main chamber of the casing by a partition 13, and this casing has a large inlet opening 14 at one end and a corresponding outlet opening at the other end, the latter of which is connected by the duct 15 with the inlet opening in the side wall of the fan casing 6.

The fan shaft 8 is extended through the duct 15 and casing 11, and has the outer end journaled in a spider 16, which is mounted on the end wall of the casing 11 in the opening 14 and constructed so that it does not materially obstruct the free entrance of air through said opening. This shaft 8 has a disk 17 secured thereon substantially midway between the end walls of the casing 11 and of suitable diameter so that the edge dips into a transverse depression 18 formed in the partition or bottom wall 13 of the main chamber of the washer unit. This depression is, in the operation of the device, filled with water which is taken up and thrown around in the casing by the rotation of the disk 17, and to aid in this function the disk is formed at several points around the periphery, for example at diametrically opposite points with small laterally bent wings 19 arranged at an angle so as to have a tendency to throw the water toward the inlet end of the casing 11.

Mounted in the casing 11 at the inlet end and extending around the opening 14 is a series of laterally spaced annular rings 22 which are dished and carried by brackets 23, which latter are mounted on the end wall of the casing 11. The outer ring 22 may, if desired, be made as a part of the end wall as shown. These rings serve as baffle plates to prevent water being thrown out through the inlet opening 14.

A plate 24, which is dished as shown and has the edge portion 25 swung towards the outlet opening, is mounted within the casing 11 between the disk 17 and outlet opening, being supported from the end wall by a number of brackets 26, and these brackets also support the rings 27 which are dished to correspond with the edge portion 25 of the plate 24. The plate 24, rings 27 and end wall serve as baffles to remove excess moisture from the air as it leaves the washing chamber, and to facilitate this function the rings 27 are provided around their inner edges with laterally bent flanges 28.

In the operation of the device, water is maintained substantially at the level of the upper surface of the partition 13 by a float feed so as to insure a constant supply of water in the depression 18. To this end a float casing 29 is provided at the side of the duct 15 adjacent the casing 11 and has an outlet 30 leading into the interior of the casing 11. The transverse depression 18 is continued along the side of the casing 11, as shown at 20 to the water supply opening 30 so that the latter enters below the level of the upper surface of the partition 13. A water supply pipe 31 leads into the float chamber and a valve 32 operated by the float 35 controls the inlet from the pipe 31 so as to automatically maintain the required depth of water in the float chamber 29 and in the washer casing 11.

The direction of rotation of the disk 17 is as indicated by the arrows, and throws the water picked up thereby across the path of movement of air in the casing 11 toward the surrounding wall of said casing. A large part of the water thus picked up is thrown against the side wall adjacent the rising edge of the disk 17, and this water is drained into the chamber 35 below the partition 13 through a pair of wells 36 which are formed against said side wall of the casing 11 at opposite sides of the plane of the disk 17, said wells being extended upwardly above the bottom wall 13 as shown in Figs. 1 and 3, and at their lower ends opening to the compartment 35. At the opposite side of the casing 11, the bottom wall of the depression 18 has an aperture 37 affording communication between the chamber 35 and the main chamber of the casing 11. Inasmuch as the level of the water maintained in the device by the float 33 is sufficient to keep the compartment 35 filled, the draining of the water into the wells 36 serves to raise the level of the water therein and set up a circulation of the water through the chamber 35 and cause an overflow through the aperture 37 into the main chamber of the casing 11, and keeps the depression 18 filled with water.

I make use of this automatic circulation to filter or remove particles of matter from the water before it is returned to the washer, by arranging a series of inclined baffle plates or partitions 38 in staggered relation in the chamber 35 as shown in Fig. 1, so as to give the water a circuitous course and provide in effect a gravity filter which will collect impurities or particles of matter in the bottom of the chamber 35, which latter is provided with a removable plug 39 closing an opening in the bottom whereby access may be had for draining and cleaning the chamber 35.

The pipe 31 may be connected to any convenient source of water supply, or if desired, a water supply tank 40 may be mounted on and supported by the fan and washer casings 6 and 11, or in any other manner, and have the pipe 31 connected to the bottom thereof A tank supply is particularly feasible with this device in view of the fact that the water is filtered and used over and over again, and a large supply of water is therefore not required, as in cases where the water is used only once.

When the device is in operation, the fan 5 draws a supply of air through the inlet 14 into the interior of the casing 11, and this air is passed through the washer chamber between the edge of the disk 17 and the surrounding walls of the casing, after which it is withdrawn through the duct 15, and discharged through the exhaust duct 7. The rotation of the disk 17 forms a curtain of mist or spray in the space between the disk and the surrounding walls of the casing, which by reason of the inclination of the wings 19, is directed somewhat against the flow of air. In this way the air is thoroughly saturated and washed, and the centrifugal force of the disk 17 and the film of mist or spray thrown off therefrom, tends to drive any particles of matter in the air against the wet walls of the casing, where they collect and are drained into the compartment 35 and filtered out in passing therethrough.

The rings 22 serve to prevent splashing or throwing of water out through the inlet opening 14, and the plate 24, rings 27 and the adjoining end wall of the casing obstruct the flow of the air as it is discharged from the casing 11. As the air is diverted by the end wall and plate 24 and rings 27 and drawn through the passages therebetween, the excess moisture in the air is collected thereon and drains down into the bottom of the main chamber of the casing 11, leaving just enough moisture in the air so that it is in proper condition for breathing.

From the foregoing, it will be observed that I have provided an air conditioning device of simple form, which may be easily constructed and which will thoroughly wash and purify the air. Furthermore, there are no operating parts which are likely to get out of order and require attention, and in view of the fact that the water is used over and over again, a large supply of water is not required in the operation of this device as in cases where the water is used only once.

While I have shown and described my invention in a preferred form, I am aware that various changes and modifications may be made without departing from the principles of my invention, the scope of which is to be determined by the appended claims.

I claim as my invention:

1. In a device of the class described, the combination of a casing having an outlet and an inlet, means for circulating air through the casing from the inlet to the outlet, a water spraying device in the casing between the inlet and outlet, and a plurality of deflector plates in the casing adjacent the outlet for intercepting and draining the water from the air, said plates having edge portions directed angularly toward the outlet opening and outwardly beyond the same and having openings with surrounding inwardly extending flanges, the inner plate being imperforate.

2. In a device of the class described, the combination of a casing having an inlet and an outlet, means for circulating air through the casing from the inlet to the outlet, a water spraying device in the casing between the inlet and outlet, a baffle plate in the casing spaced from the outlet, and a series of annular members disposed one in advance of the other between the baffle plate and outlet forming annular passageways therebetween through which the air passes from the interior of the casing between the members from their outer edges and through the central openings therein to the outlet.

3. In a device of the class described, the combination of a casing having an inlet at one end and an outlet at the other end, means for circulating air through the casing from the inlet to the outlet, means for throwing a circular wall of mist transverse vertical across and against the flow of the air through the casing including a rotating disk having bent wings and baffle members adjacent the outlet for draining the water from the air as it passes from the interior of the casing to the outlet.

4. In a device of the class described, the combination of a casing having an inlet and an outlet, means for circulating air through the casing from the inlet to the outlet, a rotary member in the casing interposed between the inlet and outlet and forming an annular passageway between said member and the surrounding wall of the casing, said member dipping in water in the casing to throw a spray outwardly and toward the inlet, annular baffle means in the casing extending around the inlet to prevent outthrow of water, and a plurality of baffle members at the outlet for draining the water from the air as it passes from the interior of the casing to the outlet.

5. In a device of the class described, the combination of a casing having an inlet opening at one end and outlet opening at the other end, means for circulating air through the casing from the inlet to the outlet, deflectors adjacent the inlet and outlet having marginal portions bent backwardly toward the respective opening, and a spraying device interposed between the inlet and outlet openings.

6. In a device of the class described, the combination of a casing having an inlet and outlet, a blower having a duct connected to the outlet of the casing for circulating air through the casing from the inlet to the outlet, a sprayer for distributing water in the path of circulation of the air in the casing and throwing the same outwardly somewhat counter to the flow of air, means for supplying water to the sprayer, means for collecting excess water discharged from the sprayer and returning such excess water to the water supply means, and members between the sprayer and the outlet from the casing for draining the water from the air as it is discharged from the casing to the outlet.

7. In a device of the class described, the combination of a casing having an inlet and an outlet, a blower for circulating air through the casing from the inlet to the outlet, a partition dividing the chamber into upper and lower compartments and having a depression therein, a rotary member in the upper compartment projecting into the depression, means for supplying water to the casing so as to fill the depression, collectors at the side of the casing for returning water discharged by the rotary member to the lower compartment of the casing for causing an overflow from said lower compartment into the depression of the aforesaid partition, and means adjacent the outlet from the casing for extracting water from the air as it is discharged from the casing into the outlet.

8. In a device of the class described, the combination of a casing having a partition forming upper and lower compartments in the casing and having inlet and outlet openings for the upper compartment, means for circulating air through the upper compartment of the casing, a rotary member in said upper compartment, a depression in the aforesaid partition into which the lower portion of the rotary member projects, means for maintaining water in the lower compartment and the depression, a well for returning water discharged by the rotary member to the lower compartment of the casing, and an overflow outlet for supplying water from the lower compartment to the depression in the partition.

9. In a device of the class described, the combination of a casing having upper and lower compartments and inlet and outlet openings for the upper compartment, a blower for circulating air through the upper compartment from the inlet to the outlet, a sprayer for discharging water in a transverse spray in the path of circulation of air in the upper compartment of the casing and counter to the flow thereof, means for returning excess water from the sprayer to the lower compartment of the casing, and means for returning the water from the lower compartment to the sprayer.

10. In a device of the class described, the combination of a casing having upper and lower compartments and inlet and outlet openings for the upper compartment, a blower for circulating air through the upper compartment from the inlet to the outlet, a sprayer for discharging a transverse circular vertical spray of water in the path of circulation of the air in the upper compartment, means for collecting water discharged by the sprayer and returning same through the lower compartment to the sprayer, and a plurality of baffle plates interposed in the path of circulation of the water in the lower compartment for purifying the water returned to the sprayer.

11. In a device of the class described, the combination of a casing having an inlet and outlet, a blower for circulating air through the casing from the inlet to the outlet, a transverse rotary member in the casing for discharging a spray of water in the path of circulation of air in the casing between the same and the casing walls and somewhat against the flow of air, a water supply leading to the interior of the casing, and a float for maintaining a suitable level of water in the casing to submerge the lower portion of the rotary member.

12. In a device of the class described, the combination of a casing having an inlet and an outlet, means for circulating air through the casing from the inlet to the outlet, a water spraying device in the casing between the inlet and outlet, a baffle plate in the casing spaced from the outlet, and a series of rings disposed one in advance of the other and in alignment between the baffle plate and outlet forming annular passages therebetween and having central passages through which the air passes from the interior of the casing to the outlet, said baffle plate being in the form of a circular member and disposed over the opening of the first ring.

13. In a device of the class described, the combination of a casing having an inlet at one end and an outlet at the other end, means for circulating air through the casing from the inlet to the outlet, means for throwing an annular curtain of water across the path of circulation of the air through the casing and between the same and the walls of the casing, and baffle members adjacent the outlet and extending outwardly thereof for draining the water from the air as it passes from the interior of the casing to the outlet.

14. In a device of the class described, the combination of a casing having an inlet and an outlet, means for circulating air through the casing from the inlet to the outlet, a rotary member in the casing interposed between the inlet and outlet and forming an annular passageway between said member and the surrounding wall of the casing, annular baffle means placed one in advance of the other and having aligned central openings with inwardly extending flanges at the edges of said openings around the inlet to prevent out-throw of water, a plurality of baffle members at the outlet for draining water from the air as it passes from the interior of the casing to the outlet, and a dished plate in front of the baffle members at the outlet, said baffle members and dished plate having their outer portions directed forwardly toward the outlet and outwardly beyond the same.

15. In a device of the class described, the combination of a casing having an inlet and outlet, a blower for circulating air through the casing from the inlet to the outlet, a sprayer for distributing water in the path of circulation of the air in the casing, means for supplying water to the sprayer, means in the casing including wells on opposite sides of the sprayer at the side of the casing for collecting excess water discharged from the sprayer and returning such excess water to the water supply means, and members between the sprayer and the outlet from the casing having marginal portions bent toward the outlet for draining the water from the air as it is discharged from the casing to the outlet.

16. In a device of the class described, the combination of a casing having an inlet and an outlet, a blower for circulating air through the casing from the inlet to the outlet, a partition dividing the chamber into upper and lower compartments, a vertical rotary winged member in the upper compartment and dipping in water therein at its lower edge, means for supplying water to the casing, means at the side of the casing for returning water discharged by the rotary member to the lower compartment of the casing for causing an overflow from said lower compartment into the upper compartment, means to prevent water from being thrown out through the inlet opening, and means adjacent the outlet for extracting part of the water from the air as it is discharged.

17. In a device of the class described the combination of a casing having a partition forming upper and lower compartments in the casing and having inlet and outlet openings for the upper compartment, the upper compartment having a bottom depression and a channel leading into the depression, the rotary member dipping into water in the depression, means for maintaining water in the lower compartment and depression through the channel, and means for collecting the water thrown outwardly by the rotary member and returning the same to the lower compartments, the lower compartment having oppositely extending baffles forming a gravity filter.

EDWARD P. COLE.